United States Patent
Wunnicke et al.

(10) Patent No.: US 12,139,625 B2
(45) Date of Patent: Nov. 12, 2024

(54) SELECTIVE SUPERPARAMAGNETIC SINTERING AND AN INK SUITABLE THEREFOR

(71) Applicant: Evonik Operations GmbH, Essen (DE)

(72) Inventors: Odo Wunnicke, Muenster (DE); Susanne Leuchs, Haltern am See (DE); Tim Hupfeld, Essen (DE); Michael Holthausen, Haltern am See (DE); Vanessa Vennemann, Gelsenkirchen (DE); Dominik Mispelkamp, Marl (DE); Maximilian Cornelius, Frankfurt am Main (DE); Helmut Mack, Traunstein (DE); Bodo Frings, Traunstein (DE); Thomas Große-Puppendahl, Schloss Holte Stukenbrock (DE); Sylvia Monsheimer, Haltern am See (DE); Frank Heindl, Rodenbach (DE)

(73) Assignee: Evonik Operations GmbH, Essen (DE)

( * ) Notice: Subject to any disclaimer, the term of this patent is extended or adjusted under 35 U.S.C. 154(b) by 137 days.

(21) Appl. No.: 17/905,426

(22) PCT Filed: Feb. 3, 2021

(86) PCT No.: PCT/EP2021/052516
§ 371 (c)(1),
(2) Date: Sep. 1, 2022

(87) PCT Pub. No.: WO2021/175528
PCT Pub. Date: Sep. 10, 2021

(65) Prior Publication Data
US 2023/0119805 A1 Apr. 20, 2023

(30) Foreign Application Priority Data

Mar. 5, 2020 (EP) ..................... 20161171

(51) Int. Cl.
| | | |
|---|---|---|
| *C09D 11/38* | (2014.01) | |
| *B41M 5/00* | (2006.01) | |
| *B41M 5/382* | (2006.01) | |
| *C09D 11/322* | (2014.01) | |

(52) U.S. Cl.
CPC .......... *C09D 11/38* (2013.01); *B41M 5/0047* (2013.01); *B41M 5/38285* (2013.01); *C09D 11/322* (2013.01)

(58) Field of Classification Search
CPC .... C09D 11/39; C09D 11/322; B41M 5/0047; B41M 5/38285; B41J 27/16
See application file for complete search history.

(56) References Cited

U.S. PATENT DOCUMENTS

| | | |
|---|---|---|
| 5,928,958 A | 7/1999 | Pilgrimm |
| 2003/0100187 A1 | 5/2003 | Gottfried et al. |
| 2006/0024235 A1 | 2/2006 | Pilgrimm |
| 2007/0241482 A1 | 10/2007 | Giller et al. |
| 2008/0292824 A1 | 11/2008 | Haeger et al. |
| 2009/0317327 A1 | 12/2009 | Pilgrimm |
| 2012/0080637 A1* | 4/2012 | Herzog .............. C08K 9/02 977/779 |
| 2017/0144424 A1* | 5/2017 | Kiriyama .......... B22F 10/12 |
| 2018/0261363 A1* | 9/2018 | Lee .................... B22F 10/16 |
| 2018/0361618 A1 | 12/2018 | Abbot, Jr. et al. |
| 2019/0127599 A1* | 5/2019 | Chen ................ C08F 293/005 |

FOREIGN PATENT DOCUMENTS

| | | | |
|---|---|---|---|
| CN | 108136497 | 6/2018 | |
| DE | 4407338 | 9/1995 | |
| DE | 4407338 A1 * | 9/1995 | ............ A61K 41/00 |
| DE | 102005049718 | 4/2007 | |
| DE | 102005059751 | 6/2007 | |
| EP | 1308240 | 5/2003 | |
| EP | 3354376 | 8/2018 | |
| JP | 2018-535115 | 11/2018 | |
| WO | 2004/034411 | 4/2004 | |

OTHER PUBLICATIONS

International Search Report dated Apr. 9, 2021, in PCT/EP2021/052516, with English translation, 8 pages.
Written Opinion dated Apr. 9, 2021, in PCT/EP2021/052516, 7 pages.
European Search Report dated Jul. 30, 2020, in European Application No. 20161171.2, 9 pages.

* cited by examiner

*Primary Examiner* — Jason S Uhlenhake
(74) *Attorney, Agent, or Firm* — Grüneberg and Myers PLLC

(57) ABSTRACT

Methods can be used for producing three-dimensional objects by powder bed fusion, using inks containing superparamagnetic particles and solvents. Sintering is performed by a magnetic field having a frequency of 50 kHz to 5 GHz.

21 Claims, No Drawings

SELECTIVE SUPERPARAMAGNETIC SINTERING AND AN INK SUITABLE THEREFOR

CROSS-REFERENCE TO RELATED APPLICATIONS

This application is the National Stage entry under § 371 of International Application No. PCT/EP2021/052516, filed on Feb. 3, 2021, and which claims the benefit of priority to European Application No. 20161171.2, filed on Mar. 5, 2020. The content of each of these applications is hereby incorporated by reference in its entirety.

BACKGROUND OF THE INVENTION

Field of the Invention

The present invention relates to the use of magnetic inks in powder bed fusion methods and to methods for producing three-dimensional objects.

Description of Related Art

Additive manufacturing methods, frequently also referred to as rapid prototyping, are used in order to be able to quickly and inexpensively manufacture three-dimensional objects. This manufacturing is effected directly on the basis of the in-computer data models from shapeless (liquids, powders or the like) or shape-neutral (in ribbon or wire form) material by means of chemical and/or physical processes. Polymer powders in particular, such as polyamide powder, are suitable as shapeless material.

As an additive manufacturing method, powder bed fusion technology includes, among other techniques, direct metal laser sintering (DMLS), electron beam melting (EBM), selective heat sintering (SHS), selective laser melting (SLM), selective laser sintering (SLS), selective absorbing sintering (SAS) and selective inhibition sintering (SIS).

The selectivity of the laser-free methods can be accomplished, for example, via absorbers (selective absorbing sintering, SAS) or inhibitors (selective inhibition sintering, SIS). In the SAS method, the absorption of the material in contact with the absorber is increased; by contrast, the inhibitor retards the melting. Absorber and inhibitor can be used together in one method. Suitable energy sources in SAS methods are those that are incorporated into the material only to a limited degree. In the SIS method, the energy source should be chosen such that the material is heated sufficiently rapidly. The SAS method is described, for example, in US 2007/238058. US 2004/137228 A1 presents the SIS method.

Absorbers and inhibitors can be applied to the material in dissolved or dispersed form in a liquid, for example by means of inkjet methods in the form of inks. Absorbers used include for example activated carbon, but this requires large amounts of energy, for example high temperatures. It Is a disadvantage with these methods that the powder material from which the three-dimensional object is formed has to be maintained at a high temperature shortly before the melting. This leads to ageing of the whole powder, which in turn results in a deterioration in the material properties of the three-dimensional object formed from recycled powder. In addition, usually only very low layer thicknesses can be simultaneously sintered together with the methods mentioned.

SUMMARY OF THE INVENTION

In this regard, the problem addressed was to provide a novel method for producing three-dimensional objects which no longer exhibits the disadvantages of the prior art. The method should make it possible to process powders into three-dimensional objects not only at elevated build chamber temperature but also at ambient temperature. In addition, the method should make it possible to achieve simultaneous sintering of layers having relatively large layer thicknesses. Furthermore, the method should be able to sinter polymer powders having high glass transition temperatures of over 200° C.

It was possible to achieve this by means of a powder bed fusion method in which a powder is provided in a layer thickness of 30 µm to 200 µm (layer). An ink is then applied by means of inkjet methods to the sites in the powder that are to be sintered, before further powder is applied. The application of ink and powder is repeated. Powder material is applied layer-by-layer as a result. A magnetic field having a frequency of 50 kHz to 5 GHz, preferably 50 kHz to 100 MHz, more preferably 500 kHz to 10 MHz, Is set for the selective sintering. The method is by preference carried out at a temperature of 10° C. to 40° C., preferably at room temperature (18° C. to 25° C.). The method mentioned above can be referred to as selective superparamagnetic sintering (SSS).

DETAILED DESCRIPTION OF THE INVENTION

The magnetic field can be activated after each application of a layer. As an alternative, the magnetic field can be activated only after application of two or more layers. This makes it possible to sinter two or more layers jointly and simultaneously. This also makes it possible to first provide the layers for an entire three-dimensional object and then to sinter the entire object.

The ink for use in powder bed fusion methods comprises superparamagnetic particles and at least one solvent. The superparamagnetic particles are preferably formed as core/shell particles, wherein at least one core comprises at least one superparamagnetic substance and the at least one shell is non-magnetic.

The magnetic field provides for heating of the superparamagnetic particles and hence of the powder. Néel relaxation or Brownian motion is responsible for the heating. Heating via induced eddy currents is in contrast negligibly low. The application of a magnetic field additionally does not lead to conventional absorption, as electrons in the solid are not brought to higher states as a result of energy such as for example light. Instead, they undergo alignment in the alternating magnetic field.

Due to the printheads typically used, the ink for the inkjet method requires particle sizes of not more than 10 µm, preferably of not more than 1 µm. The constituents of the inks—with the exception of the superparamagnetic particles—preferably have sizes in the range from 50 to 500 nm.

The solvent can be aqueous or nonaqueous. The ink preferably contains 50% to 75% by weight of solvent, based on the total weight of the ink. The solvent is preferably aqueous. Preferred aqueous solvents contain at least 20% by weight of water, preferably at least 50% by weight of water, based on the total weight of solvent. The ink, in particular the nonaqueous ink, can also contain an additive for controlling thermal conductivity (thermal conductivity additive). Those skilled in the art may possibly use these when an adaptation of the thermal conductivity appears necessary in order obtain better quality shaped bodies. Simple preliminary experiments may be used for this purpose. Such an additive can for example be electrically non-conductive. This includes, for example, magnesium oxide, aluminium oxide, aluminium trihydroxide, hexagonal boron nitride, aluminium nitride, aluminosilicate, zinc sulfide or mixtures thereof. Suitable electrically conductive additives are selected from graphite, carbon black, carbon nanotubes and mixtures thereof.

In one preferred embodiment, water and additionally a water-miscible organic solvent, preferably a protic organic solvent, are used. "Miscible" means that there is no phase separation. The organic solvent should have a boiling point of <300° C. at 1013 hPa. Particularly preferred solvents are selected from 2-pyrrolidone, ethylene glycol, methoxylsopropanol, polyethylene glycol and mixtures thereof.

The ink containing aqueous solvents by preference has a pH of 3 to 12, preferably of 4 to 11 and particularly preferably of 4 to 9. Those skilled in the art are familiar with adjusting the pH and this can be done with appropriate acids or bases.

The superparamagnetic particles are preferably selected from the group of ferromagnetic, antiferromagnetic or ferrimagnetic substances. They are preferably selected from substances containing Fe, Co, Ni, Nd and mixtures thereof. This includes compounds thereof and alloys thereof. Suitable compounds or alloys are neodymium-iron-boron, samarium-cobalt, neodymium-nitrogen, aluminium-nickel-cobalt, $Fe_2TiSn$, $CoFe_2O_4$, $Bi_{0.95}Mn_{0.05}FeO_3$, $Ni_{0.5}Zn_{0.5}Fe_2O_4$, $xNiFe_2O_4\text{-}(1\text{-}x)BaTiO_3$ (x=0.2 or 0.3)), $La_{0.8}Sr_{0.2}MnO_3$, Ba and Ta co-doped $BiFeO_3$ ceramics, $Fe_2O_3$, $FesO_4$, and mixtures thereof. $Fe_2O_3$, $Fe_3O_4$ are particularly preferred.

The core/shell particles comprise at least one core having at least one superparamagnetic substance. The diameter of a core by preference has a diameter of 2 nm to 50 μm, preferably of 2 nm to 100 nm, particularly preferably of 2 nm to 50 nm and very particularly preferably of 2 nm to nm. The diameter for $Fe_3O_4$ is particularly preferably 2 nm to 13 nm. The core diameter depends in particular on the dimensions in which the superparamagnetic properties arise. Those skilled in the art will select suitable diameters depending on the chosen material.

The diameter of the core/shell particles is preferably 3 nm to 100 μm.

Suitable core/shell particles are described for example in WO 2012/103974 or WO 2014/009107. These are supplied, for example, under the name MagSilica by Evonik.

The shell is non-magnetic, preferably non-paramagnetic. Metals as the shell material are thus excluded. The shell is preferably diamagnetic. Preferred shell materials are silicon oxides; silicon dioxide is particularly preferably suitable. The shell material of the core-shell particle should be temperature-stable, that is to say that no decomposition, melting or sublimation should occur at temperatures of >200° C., ideally up to the Curie temperature of the core used.

The surface of the shell can be modified. The modification can for example be hydrophilic, hydrophobic or oleophobic. The modification can be effected during or after the production of the core-shell particles. Suitable modifications are for example carried out by means of alkylalkoxysianes, which lead to a hydrophobic modification. Suitable silanes are preferably selected from hexamethyldisilazane (HMDS, Dynasylan HMDS from Evonik), octyltrimethoxysilane (Dynasylan OCTMO from Evonik), octyltriethoxysilane (Dynasylan OCTEO from Evonik), hexadecyitrimethoxysilane (Dynasylan 9116 from Evonik), and mixtures thereof. For hydrophilic modifications, polyether-functional trimethoxysilanes are suitable. Correspondingly modified particles increase dispersibility and stability. Polyether-functional trimethoxysilanes are available for example as Dynasylan 4148 or Dynasylan 4150 (Evonik).

The method for modifying the shell is carried out for example by mixing the core/shell particles with water and the silane. The mixture is then heated for a few hours to temperatures or 80° C. to 120° C.

This is followed by drying the powder over a plurality of hours. To check for complete reaction, the pH of the mixture can be monitored. The shell around the superparamagnetic particles results in encapsulation of the particles. Encapsulation has the advantage that the particles do not come into direct contact with the powder for the three-dimensional object. Contamination or direct contact of the powder with metals or compounds of metals, which could otherwise possibly lead to ageing of the three-dimensional object, is avoided.

Preferred inks contain 0.5% to 40% by weight of core/shell particles, 50% to 75% by weight or at least one solvent, 0% to 10% by weight of pigments, 0% to 3% by weight of dispersants, 0% to 4% by weight of a thermal conductivity additive and 0% to 3% by weight of wetting agents, based in each case on the total weight of ink. Suitable dispersants and wetting agents are selected from methoxylsopropanol, polyacrylates, polyethers, polysiloxanes, alkoxylates, polyamides, amino alcohols, amines, inorganic acids and alkalis, long-chain organic acids or salts thereof.

A preferred powder for the method for producing three-dimensional objects is a polymer powder. Suitable polymers of the polymer powder are selected from polyamides, polyimides, polyolefins such as polyethylene and polypropylene, polyesters and polyaryl ether ketones (PAEK) such as polyether ether ketone (PEEK). Suitable polyamides may be customary and known polyamides. Polyamides Include homopolyamides and copolyamides. Suitable polyamides or copolyamides are selected from polyamide 6, 11, 12, 1013, 1012, 66, 46, 613, 106, 11/1010, 1212 and 12/1012. A preferred polyamide is selected from polyamide 11, 12, 1013, 1012, 68, 613, 11/1010, 1212, and 12/1012, particularly preferably polyamide 11 or 12 and very particularly preferably polyamide 12.

The Invention further provides for the use of the ink according to the invention in a powder bed fusion method, wherein said method is preferably selective absorbing sintering (SAS). It is preferable here to apply the ink by means of inkjet methods.

EXAMPLES

Example 1: Sintering of Powder

Approx. 50 g of PEEK powder (VESTAKEEP 2000 FP) were manually sieved using a sieve with a mesh size of 125 μm. Iron(II/III) oxide (50-100 nm), iron(II/III) oxide <5 μm or superparamagnetic core/shell particles (core: =13 nm, shell: silicon dioxide; MagSilica from Evonik; $d_{50}$ particle size=200 nm) was/were then added to the <125 μm fraction in the ratio 9:1 (w/w). 10 g of each powder mixture were prepared. The powder mixtures were then finely mixed for approx. 2 h at 40 rpm in a PRM Mini II type drum hoop mixer from J. Engelsmann AG using 12 grinding balls having a diameter of 5 mm. The powder mixtures were then individually filled into silicone moulds and sintered for 10 s at a frequency of 1 MHz under an induction coil (flat geometry; diameter: 5 cm; number of windings N=4-5) with a spacing of <3 mm from the powder bed surface.

| No. | Fe component | Fe component particle size | | m/g | Power input relative |
|---|---|---|---|---|---|
| 1 | Fe(II/III) oxide | <5 | μm | 0.031 | 1.00 |
| 2 | Fe(II/III) oxide | 50-100 | nm | 0.065 | 2.10 |
| 3 | MagSilica | MagSilica | | 0.206 | 6.65 |

Solids were produced here with different masses as a function of the iron component. If Fe(II/III) oxide <5 μm was mixed into the PEEK powder as energy-absorbing component, the mass of the molten solid was approx. 30 mg, with smaller particles the mass of the solid was 65 mg, and with MagSilica particles a solid with a mass of 206 mg could be produced in the same time and with the same frequency and field strength. The energy introduction with MagSilica as energy-absorbing component is therefore 6.65 times greater than with Fe(II/III) oxide <5 μm, assuming that all phase transitions and hence also the profile of the specific heat capacity C are identical in all three samples.

Example 2: Production of a Printed Polyamide 12 Tensile Specimen

For the production of a printable, aqueous MagSilica ink, a dispersion having a relatively high MagSilica content was first produced.
Production of MagSilica Dispersions
MagSilica HS (Evonik) was used for the production of the MagSilica dispersions. In order to produce the dispersions, a jacketed dispersing vessel with connected water cooling is charged with 100 g of demineralized water, and to this 45.8 g of MagSilica powder was then added in steps. In this case, dispersion was performed in the range of approx. 900-2000 $min^{-1}$ using a dissolver disc situated centrally in the vessel. The temperature was held constant at approx. 18° C. After the whole amount of MagSilica had been added and homogeneously dispersed, the disperser disc was removed and replaced with an ultrasonic sonotrode. The sonotrode had a power of approx. 400 W. Dispersion was then performed for 30 minutes by means of ultrasound, with the temperature likewise being held constant at approx. 18° C. by the cooling of the jacket. At the end of dispersion, the sonotrode was removed and the dispersion was characterized. The ignition residue of the dispersion was 33.5%; the viscosity of the dispersion was 72.7 mPas at a shear rate of 100 $s^{-1}$ and 493.1 mPas at a shear rate of 10 $s^{-1}$ and a temperature of 23° C. (Physica MCR 300, Anton Paar).
Production of MagSilica-Containing Inks
For the production of a water-based, MagSilica-containing ink, 2.5 g of the above-described stock dispersion were mixed with 10 mg of TegoWet 500 (wetting additive) and 7.49 g of water, the pH was adjusted to 10.5 with a dilute KOH solution, and the mixture was then treated with an ultrasound finger (0.5; 70%, 5 min). The pH of the dispersion was then monitored and readjusted when necessary. Before the ink was printed, it was filtered through cellulose.
Production of a DIN Standard 5A Tensile Specimen
For the production of a DIN standard 5A tensile specimen, 12 layers of 150 μm Vestosint 1115 alternating with printed layers of the above-described ink were first produced in the appropriate shape (DIN 5A cross section) on a coating substrate made from PVC. All 12 layers were sintered together at a power of 5 kW and a frequency of 980 kHz.
Ink Characterization and Test Print on a Dimatix:
Droplet speed: 7.1 m/s
Viscosity (30° C., 1000 s-1) 1.84 mPas
Surface tension: 21.4 mN/m
Density: 1.09 g/ml
The finished tensile specimen was tested in respect of its tensile strength and extensibility by means of tensile testing in accordance with DIN EN ISO 527-1 at room temperature. The tensile strength measured was 23.1 MPs and the corresponding elongation at break was 11%. A test specimen formed in an analogous manner by melting had a comparable tensile strength of 21.3 MPa and a slightly higher elongation at break of 15%.

The invention claimed is:
1. A method, comprising:
fusing a powder bed with an ink,
wherein the ink comprises:
superparamagnetic particles, and
at least one solvent, and
wherein the powder bed comprises a polymer powder selected from the group consisting of polyamides, polyimides, polyolefins, polyesters, and polyaryl ether ketones.
2. The method according to claim 1, wherein the superparamagnetic particles are core/shell particles having
at least one core comprising at least one superparamagnetic substance, and
at least one non-magnetic shell.
3. The method according to claim 2, wherein the at least one core has a diameter of 2 nm to 50 nm.
4. The method according to claim 2, wherein a diameter of the core/shell particles is 3 nm to 100 nm.
5. The method according to claim 2, wherein a surface of the at least one non-magnetic shell is functionalized with at least one alkylalkoxysilane or at least one polyether-functional trimethoxysilane.
6. The method according to claim 5, wherein the at least one alkylalkoxysilane is selected from the group consisting of hexamethyldisilazane, octyltrimethoxysilane, octyltriethoxysilane, hexadecyltrimethoxysilane, and a mixture thereof.
7. The method according to claim 2, wherein the ink contains:
0.5% to 40% by weight of the core/shell particles,
50% to 75% by weight of the at least one solvent,
0% to 10% by weight of pigments,
0% to 3% by weight of dispersants,
0% to 4% by weight of a thermal conductivity additive, and
0% to 3% by weight of wetting agents,
based in each case on a total weight of ink.
8. The method according to claim 1, wherein the at least one solvent is an aqueous solvent.
9. The method according to claim 8, wherein the ink further comprises a water-miscible organic solvent.
10. The method according to claim 9, wherein the water-miscible organic solvent is a protic solvent.
11. The method according to claim 9, wherein the water-miscible organic solvent is at least one selected from the group consisting of 2-pyrrolidone, ethylene glycol, methoxyisopropanol, polyethylene glycol, and a mixture thereof.
12. The method according to claim 8, wherein a pH of the ink is 3 to 12.

13. The method according to claim 1, wherein the superparamagnetic particles are selected from the group consisting of a ferromagnetic substance, an antiferromagnetic substance, and a ferrimagnetic substance.

14. The method according to claim 13, wherein the superparamagnetic particles are a substance containing Fe, Co, Ni, Nd, or a mixture thereof.

15. The method according to claim 1, wherein the ink is applied by an inkjet method.

16. The method according to claim 1, wherein the fusing is performed by selective absorbing sintering.

17. The method according to claim 1, wherein the polymer powder comprises polyether ether ketone.

18. A method for producing a three-dimensional object by powder bed fusion, the method comprising:
   a. providing a powder in a layer thickness of 30 to 200 μm,
   b. applying an ink by an inkjet method to sites in the powder that are to be sintered,
   c. applying an additional amount of the powder,
   d. repeating b and c, to obtain a layered arrangement, and
   e. selectively sintering the layered arrangement with a magnetic field having a frequency of 50 kHz-5 GHz, wherein the ink comprises superparamagnetic particles and at least one solvent, and wherein the powder comprises a polymer powder selected from the group consisting of polyamides, polyimides, polyolefins, polyesters, and polyaryl ether ketones.

19. The method according to claim 18, wherein the method is carried out at a temperature of 10° C. to 40° C.

20. The method according to claim 19, wherein the method is carried out at room temperature.

21. The method according to claim 18, wherein the magnetic field has a frequency of 500 kHz-10 MHz.

* * * * *